Patented June 30, 1936

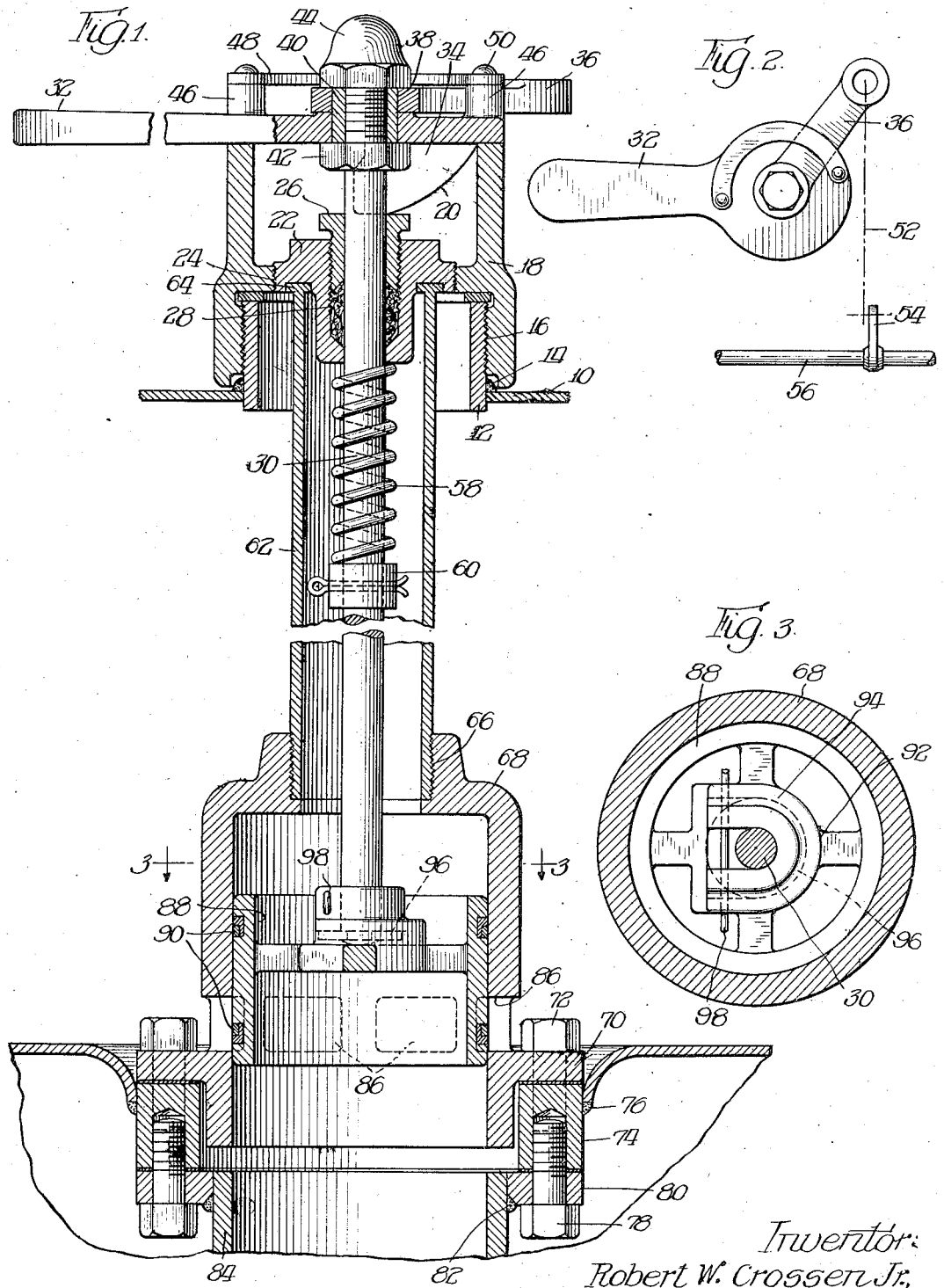

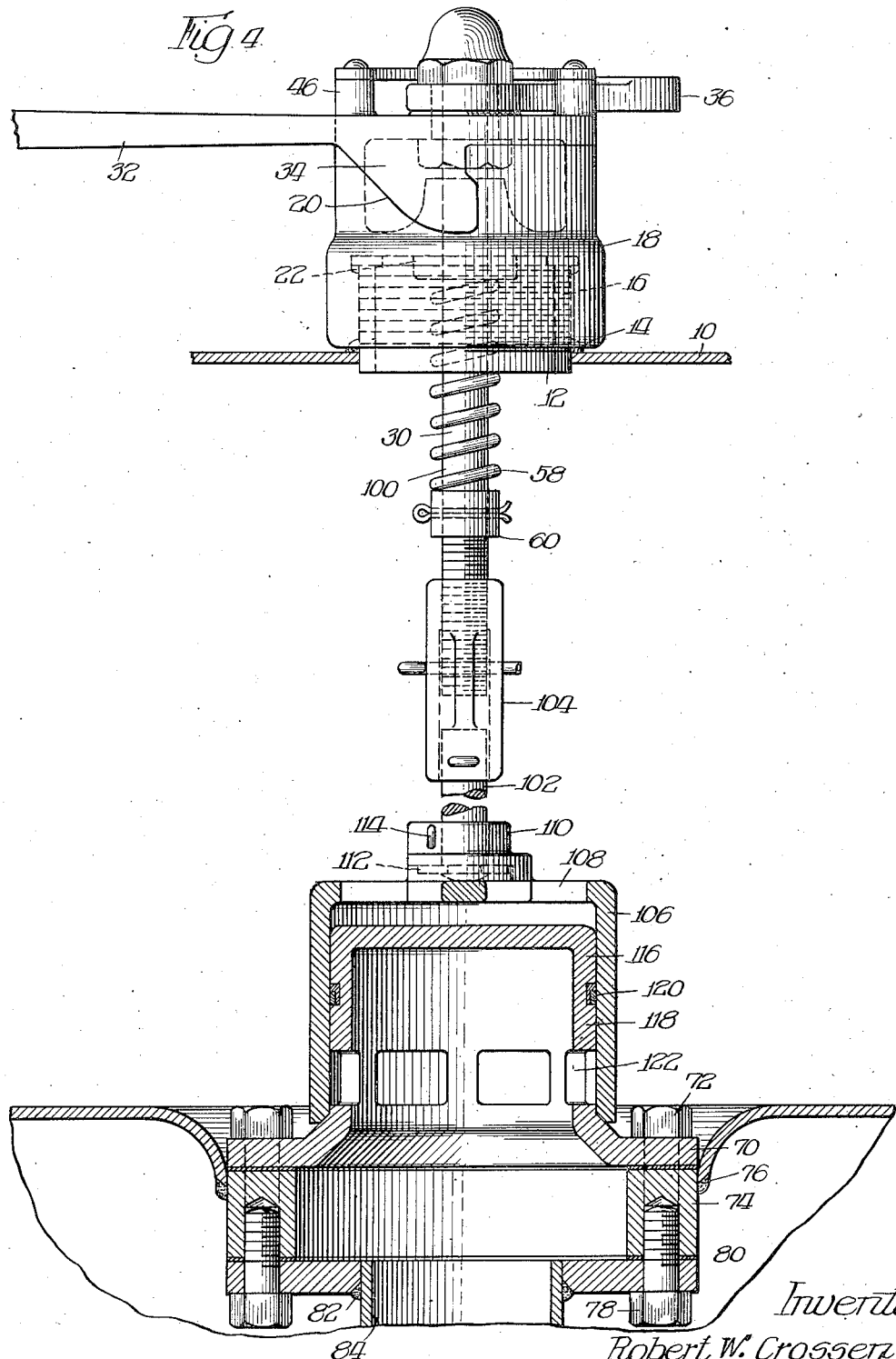

2,045,758

UNITED STATES PATENT OFFICE 2,045,758

VALVE

Robert W. Crossen, Jr., Plainfield, Ill., assignor to Farrell Manufacturing Company, Joliet, Ill., a corporation of Illinois Application November 25, 1931, Serial No. 577,194

9 Claims. (Cl. 137—21)

This invention pertains to valves and more particularly to emergency valves for tank wagons or other containers.

In the truck tank industry it has been usual to provide a vehicle having a tank which is provided with a plurality of compartments. The different compartments are adapted to contain different types of gasoline, oil, or other fluids to be dispensed to service stations and the like, and it has been usual to fill these tanks through a man hole adjacent the top thereof. While the tanks are being filled through the manhole cover considerable loss occurs by evaporation as the gasoline boils and foams. In order to overcome this agitation and loss, it is proposed to fill the tanks from a point adjacent the bottom thereof.

It is therefore an object of this invention to provide a valve construction which is readily operable and is designed to shut off the flow of fluid such as gasoline after a tank compartment has been filled from a point adjacent the bottom thereof.

Another object is to provide a device permitting filling of compartments of tanks, and at the same time acting as an emergency valve.

A further object is to provide a valve construction which is operable to permit the ready supply of fluid to a tank wherein the fluid will not have to overcome any obstruction, such as the force of a coil spring as where the valve is a normally closed one.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is an enlarged sectional elevation through a tank and the control valve embodying the invention;

Figure 2 is a top plan view showing means for operating the valve construction shown in Figure 1;

Figure 3 is a sectional top plan view through the valve construction, the same being taken substantially in the plane as indicated by the line 3—3 of Figure 1;

Figure 4 is a sectional elevation corresponding to Figure 1 showing a modified form of valve construction.

Referring first of all more particularly to the constructions illustrated in Figures 1, 2, and 3, the tank 10 is provided with the pipe fitting 12 welded thereto as at 14 and provided adjacent the top of said tank. The fitting is screwthreaded as at 16 and adapted to receive the cam fitting 18, the cam fitting being provided with the cam portion 20. The fitting is provided with the stuffing box 22 secured thereto as by the threads 24, the stuffing box being completed by the bushing 26 and packing 28. The valve operating rod 30 extends through the stuffing box and is provided with the operating handle 32.

The operating handle is provided with the cam member 34 corresponding or complementary to the cam portion 20, the operating rod 30 being adapted to be pivotally disposed with respect to the operating handle 32. The auxiliary operating lever 36 may be pivotally mounted as at 38 on the bushing 40 provided on the operating rod 30, the operating assembly being completed by the spaced nuts 42 and 44. The operating handle 32 is provided with the upwardly extending bosses 46 to which the keeper segment 48 is secured as at 50, the bosses acting as stops for limiting the lost motion of the lever 36. A flexible connection 52 is secured to the operating lever 36 and to a lever 54 provided on an operating shaft 56, which may be remotely operated, and similarly connected to a plurality of operating levers 36 of a plurality of valve members whereby they may all be operated simultaneously.

The cam 34 is urged toward the position illustrated in Figure 1, that is, where the valve is in closed or inoperative position, by means of the spring 58 disposed between the stuffing box and an adjustable collar 60 provided on the rod 30. A tube 62 is sealed as by the leather gaskets 64 to the stuffing box and is secured as by the threads 66 to the valve cylinder 68. The valve cylinder 68 is flanged as at 70, the flanges being secured as at 72 to the ring 74, said ring being welded as at 76 to a lower portion of the tank 10 at a point adjacent the bottom thereof. The ring 74 is secured as at 78 to the flange member 80, said member being welded as at 82 to a sump 84 leading to the manifold. The manifold, it will be understood, extends along the bottom of the tank vehicle and is provided with similar sumps to the valve assemblies of the various compartments, the end of the manifold being provided with a fill pipe running up above the tank and to which the fill hose may be attached for supplying liquid to the manifold and selectively through the various valve arrangements.

The valve cylinder 68 is ported as at 86, the ports being controlled by the piston valve 88 slidably mounted in the housing. The piston valve is provided with a suitable number of piston rings 90 insuring proper sliding cooperation with the valve and the valve cylinder. The valve is provided with the spider 92 having a horseshoe socket 94 adapted to pivotally receive the headed end 96 of the operating rod 30, the rod being secured by a suitable cotter pin 98.

Referring now more particularly to the construction shown in Figure 4, it being understood that the operating means illustrated in Figure 2 may be applied to this figure as well as to the construction shown in Figures 1 and 3, the tank 10 is provided with the pipe fitting 12 welded thereto as at 14 provided adjacent the top of said tank. The fitting is screw-threaded as at 16 and adapted to receive the cam fitting 18. The cam fitting is provided with the cam portion 20, the cam portion being provided with the stuffing box 22 through which the valve operating rod 30 extends.

The valve operating rod is adapted to be controlled by the operating handle 32 having the cam member 34 cooperating with the cam portion 20, the auxiliary operating lever 36 being associated with the operating handle 32 and movable between the bosses 46 whereby lost motion is provided before the lever 36 is effective to operate the lever 32 and permitting ready operation of the handle 32 and closure of the valve. The cam 34 is urged to the position illustrated in Figure 4 by means of the coil spring 58 disposed between the stuffing box and the adjustable collar 60 provided on the rod 30. The valve operating rod is made in a plurality of parts 100 and 102 joined by the adjusting sleeve 104 for regulating the relative positions between the operating handle and the sleeve valve or piston valve 106.

The valve member 106 is provided with the spider 108 having the horseshoe socket 110 thereon adapted to pivotally receive the head 112 of the rod portion 102, the parts being maintained in operative assembly by means of the cotter pin 114. The valve member 106 is adapted to embrace the upwardly extending cylindrical portion 116 of the valve cylinder 118, and suitable piston rings 120 are provided for proper sliding cooperation between the cylinder and piston. The valve cylinder is ported as at 122, the ports being controlled by movement of the piston valve 106. The valve cylinder is flanged as at 70, the flanges being secured as at 72 to the ring 74, said ring being welded as at 76 to the lower portion of the tank 10. The ring 74 is secured as at 78 to the flange member 80, said member being welded as at 82 to the sump 84 leading to the manifold.

In operation of the valve assemblies, in the event that a plurality of valves is to be operated simultaneously for filling from the manifold, the operating shaft 56 is rotated, causing movement of the lever 54 and consequently the lever 36 whereby the handle 32 is rotated. Rotation of the handle 32 causes the cam 34 to move upwardly along the cam 20, moving the valve members upwardly to open the ports. The manifold having already been supplied with liquid through the fill pipe or hose, liquid is permitted to be supplied to the tanks through the ports 86 or 122. After the tanks have been filled movements of the handle 32 will move the cam 34 from the flattened portion of the cam fitting 18 on to the cam 20 where the springs 58 will aid in closing the valve cutting off supply from the manifold to the tanks. It will of course be appreciated that these valves can be used as a supplementary means for drawing off the liquid contained in the tank, as well as means for supplying liquid to the tanks.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a tank, the combination of a ported valve body disposed adjacent the bottom of said tank, a valve member disposed in said body and movable to control flow through the ports thereof, control means for said valve member disposed adjacent the top of said tank, said means including a fitting secured to and closing an opening in the top of the tank and being provided with a cam member, an operating rod passing through a stuffing box in the fitting and connected to said valve member, a handle rotatably mounted on said rod and provided with a complementary cam portion cooperating with said cam member whereby rotation of said handle moves the valve member through movement induced through relative movements between said cam portion and cam member, resilient means for urging said valve member to closed position, and an auxiliary operating lever rotatable on the rod and operative to cause movement of said valve member.

2. In a tank for transporting liquids, the combination of a valve body disposed in the bottom wall of the tank and having a plurality of ports communicating with the interior of the tank, a valve member associated with said body and movable to control flow through the ports, control means for said valve member including a fitting secured to and closing an opening in the top wall of the tank, a cam member on the fitting and a stuffing box therein, an operating rod passing through the box and connecting with the valve member, a handle rotatably mounted on the rod and having a complementary cam portion, said handle causing movement at the rod to actuate the valve member upon rotation thereof through engagement of the cam member with the cam portion, spaced stop members on the handle, and an auxiliary operating lever rotatably mounted on the rod and positioned between the stop members, whereby rotation of the lever when engaging a stop member will cause rotation of the handle.

3. In a tank, the combination of a conduit connected to a point adjacent the bottom of said tank, a valve body communicating with the conduit and projecting within the tank, a valve associated with the valve body, control means for the valve disposed on the top of the tank, said means including a cam member, a handle having a complementary cam portion and a connection from the handle to the valve, spaced stops on the handle, and an auxiliary operating lever rotatably mounted on the rod and positioned between the stops whereby rotation of the lever when engaging a stop will cause rotation of the handle.

4. In a tank, the combination of a ported valve body disposed adjacent the bottom of said tank, a seatless valve member associated with said body and movable to control the flow through the ports thereof during filling or discharge of said tank, control means for said valve member disposed adjacent the top of said tank, said means including a fitting secured to and closing an opening in the top of the tank and being provided with a cam member, an operating rod passing through a stuffing box in the fitting and connecting with said valve member, said rod carrying a coil spring disposed between said fitting and a collar on the rod to resiliently urge the valve member into position to close the ports in the valve body, and a handle rotatably mounted on said rod and provided with a complementary cam portion cooperating with said cam member whereby rotation of the handle causes reciprocation of the valve member to open and close the ports in the valve body, the entire force of said spring being continuously effective to hold said cam members in contact.

5. In a tank, the combination of a ported valve body disposed adjacent the bottom of said tank, a seatless sleeve valve member positioned within said body and movable to control the flow through the ports thereof during filling or discharge of said tank, said sleeve valve having passages for fluid flow longitudinally therethrough, control means for said valve member disposed adjacent the top of said tank, said means including a fitting secured to and closing an opening in the top of the tank and being provided with a cam member, an operating rod passing through a stuffing box in the fitting and connecting with said valve member, a sleeve enclosing said operating rod and having a sealed connection with the fitting and the valve body, and a handle rotatably mounted on said rod and provided with a complementary cam portion cooperating with said cam member whereby rotation of said handle causes reciprocation of said valve member to open and close the ports in the valve body.

6. In a tank, the combination of a ported valve body disposed adjacent the bottom of said tank, a seatless sleeve valve member having slidable movement within said valve body to control the flow through the ports thereof during filling or discharge of said tank, said sleeve valve having passages for fluid flow longitudinally therethrough, control means for the valve member disposed adjacent the top of the tank and including a fitting secured to and closing an opening in the top of the tank and provided with a cam member, an operating rod passing through a stuffing box in said fitting, said rod having a rotatable connection with said valve member, a coil spring carried by said rod and confined between said stuffing box and a collar on said rod to urge the valve member to a closed position, a sleeve enclosing the rod and having a sealing connection with the fitting and valve body, and a handle rotatably mounted on the end of the rod projecting from said fitting and provided with a complementary cam portion cooperating with said cam whereby rotation of said handle causes reciprocation of said valve, the entire force of said spring being effective to maintain continuous contact between said cams.

7. In combination with a tank, a valve body attached to said tank having an opening at one end through the bottom of said tank for fluid flow in one direction to fill the tank and in the other direction to empty the tank, said valve body having a sealed wall at the other end thereof, said valve body having an annular wall portion between the ends thereof provided with ports in communication with the interior of said tank, a seatless sleeve valve slidable within said valve body to open and close said ports, said sleeve valve having passages for fluid flow longitudinally therethrough, an operating rod attached to said sleeve valve and projecting through said sealing wall of said valve body, a cam member carried by the projecting end of said operating rod movable axially therewith, a stationary cam member positioned for engagement with said first cam member, a spring reacting upon said rod to maintain continuous contact between said cams and a lever member for rotating said first cam to produce axial movement of said rod for opening and closing of the ports by the sleeve valve.

8. In combination with a tank, a connection at the bottom of said tank for delivery of fluid to and from said tank, a cylindrical ported valve body within said tank secured to said connection, a sleeve valve slidable within said valve body to open and close the ports in said valve body, said valve having a spider whereby fluid tending to flow into the tank is free to flow through said spider and produce a substantially balanced fluid pressure above and below said valve within said valve body, a fitting at the top of said tank having a cam thereon, a tube connected at its ends to said fitting and to said valve body, a stuffing box in said fitting, an operating rod extending through said stuffing box and through said tube and connected at its lower end to the spider of said sleeve valve, a handle rotatably mounted on the end of said rod above said fitting, said handle having a cam portion complementary to and cooperating with the cam on said fitting whereby movement of said handle will cause raising and lowering of said rod to move said sleeve valve and open and close the ports in said valve body.

9. In combination with a tank, a connection at the bottom of said tank for delivery of fluid to and from said tank, a cylindrical ported valve body within said tank secured to said connection, a sleeve valve slidable within said valve body to open and close the ports in said valve body, said valve having a spider whereby fluid tending to flow into the tank is free to flow through said spider and produce a substantially balanced fluid pressure above and below said valve within said valve body, a fitting at the top of said tank having a cam thereon, a tube connected at its ends to said fitting and to said valve body, a stuffing box in said fitting, an operating rod extending through said stuffing box and through said tube and connected at its lower end to the spider of said sleeve valve, a handle rotatably mounted on the end of said rod above said fitting, said handle having a cam portion complementary to and cooperating with the cam on said fitting whereby movement of said handle will cause raising and lowering of said rod to move said sleeve valve and open and close the ports in said valve body, and a spring surrounding said rod within said tube reacting between said fitting and a collar on said rod for maintaining said cams in contact.

ROBERT W. CROSSEN, Jr.

CERTIFICATE OF CORRECTION.

Patent No. 2,045,758.  June 30, 1936.

ROBERT W. CROSSEN, JR.

It is hereby certified that error appears in the printed specification of the above numbered patent requiring correction as follows: Page 2, secood column, line 50, claim 2, for "at" read of; and that the said Letters Patent should be read with this correction therein that the same may conform to the record of the case in the Patent Office.

Signed and sealed this 22nd day of September, A. D. 1936.

(Seal)

Henry Van Arsdale
Acting Commissioner of Patents.